Dec. 27, 1932.    L. DE MARKUS ET AL    1,892,042
CONTAINER HANDLING APPARATUS
Filed Feb. 4, 1929    2 Sheets-Sheet 2
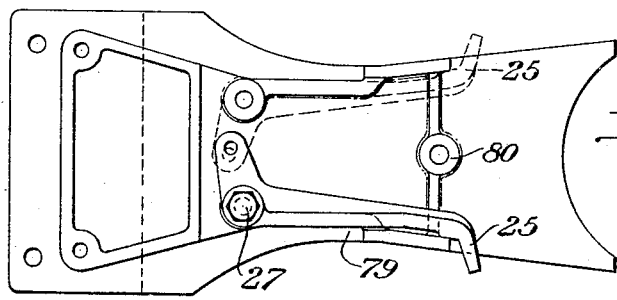
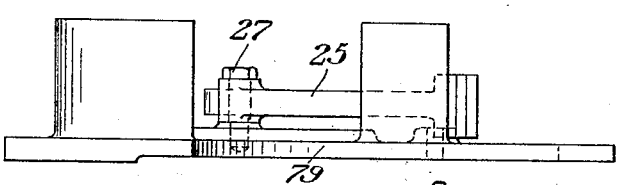
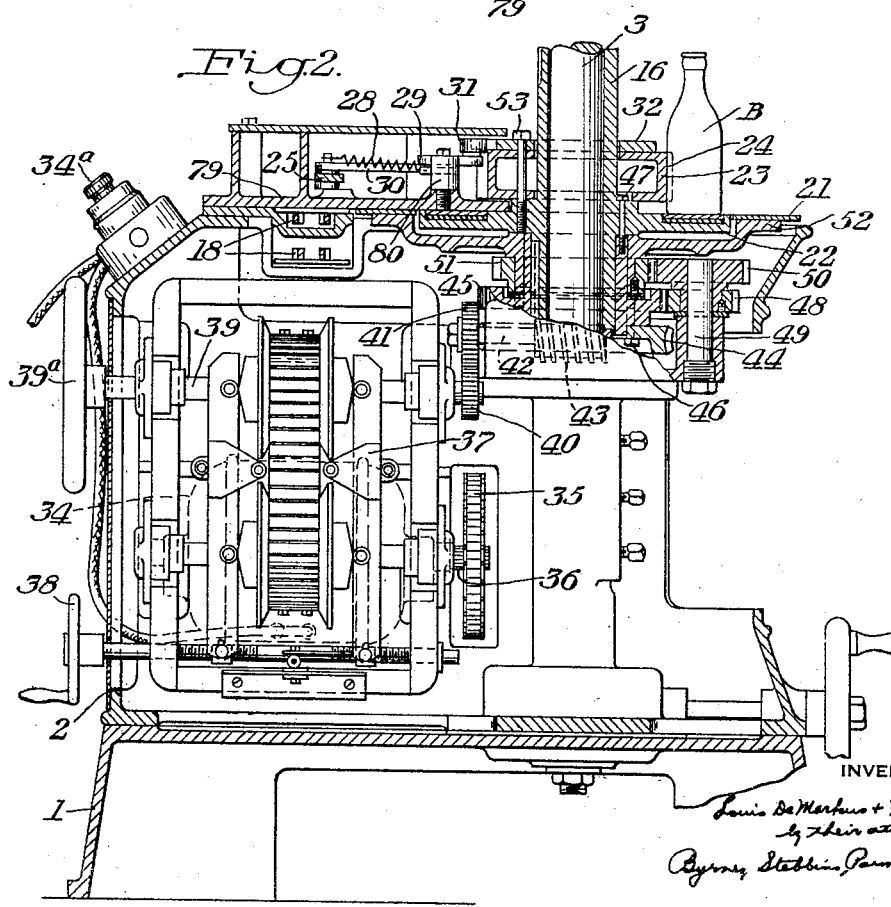
INVENTOR Patented Dec. 27, 1932

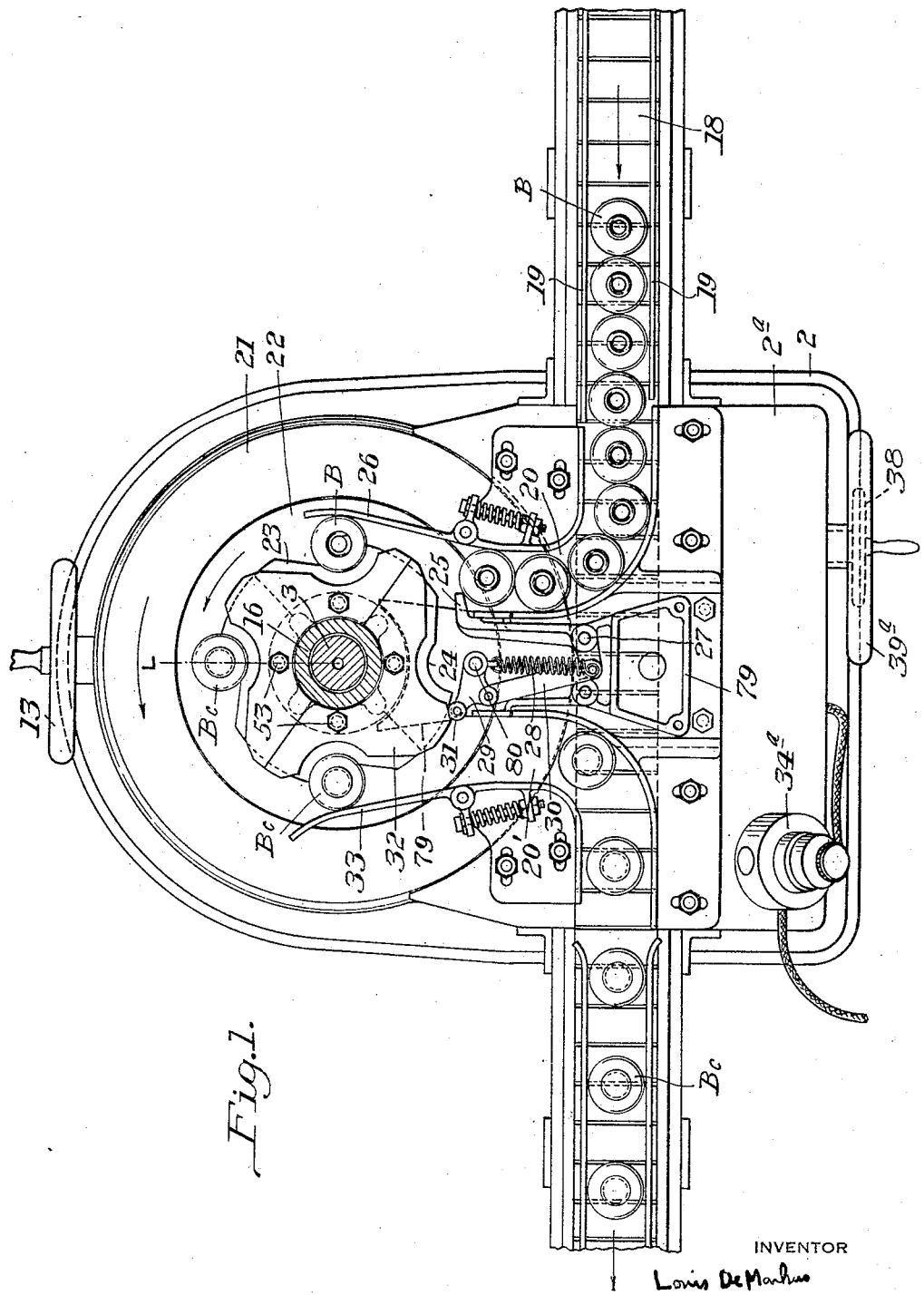

1,892,042

UNITED STATES PATENT OFFICE

LOUIS DE MARKUS AND FRED A. FOUSER, OF PITTSBURGH, PENNSYLVANIA, ASSIGNORS TO McKENNA BRASS & MANUFACTURING COMPANY, INC., OF PITTSBURGH, PENNSYLVANIA, A CORPORATION OF PENNSYLVANIA

CONTAINER HANDLING APPARATUS

Application filed February 4, 1929. Serial No. 337,241.

This invention relates to container handling apparatus, and is herein particularly described as container handling apparatus for use in connection with a crowner for bottles, as particularly described and claimed in our copending application Serial No. 556,470 for container handling apparatus, although certain features of the invention have other applications.

Many container handling devices such as crowners, syrupers and fillers are of the rotary type wherein the containers travel to a rotating support or table and are subjected to crowning, syruping, filling or the like while so supported. Many feeding devices have been employed in connection with such rotary tables, but most of them are open to numerous objections. The proper centering of the container on the support is of importance. It is highly desirable that the transfer from the conveyors to the support be effected at high speed (so as to insure large capacity) and at the same time without danger of tipping.

We provide a supporting disk having a rim and means for rotating the disk and the rim at different angular velocities. In practice, the containers are fed from a conveyor across the rim to the disk and then after they have passed through the machine, they are fed from the disk across the rim to the take-off conveyor. In practice, the rim is driven at higher speed than the disk, and this high speed rim cooperating with suitable guides quickly takes the containers to and from the disk without danger of choking and without danger of the containers tipping over.

The rim may be driven in any desired manner, but we prefer to connect it through gearing to the disk itself, so that driving of the disk effects the driving of the rim in the proper direction and at the desired proper relative speed.

The feeding means employed preferably includes a stop arranged to check the movement of the container as it is about to pass from the rim onto the disk. When it is desired to feed the container, the finger is retracted and the disk moving at relatively high speed quickly advances the container to its position on the disk.

Rotary container handling machines as heretofore constructed have been uni-directional. This has frequently been decidedly disadvantageous from the point of view of plant layout. We provide a machine which may be operated in either direction. The feed and take-off channels for the conveyors are arranged symmetrically relative to the center line of the machine and the feed means employed preferably lies between these channels.

The feed means is preferably arranged so as to be turned over, thus making it effective for operating on the channel to either side. The feed means is preferably driven from a cam on the container supporting disk, and this cam together with such container receiving pockets as may be provided on the disk, is also made reversible. With this arrangement it is a relatively simple matter to change the direction of the machine from clockwise to counter-clockwise, thus adapting it to the particular problem of plant layout which is encountered.

Container handling devices of this character find particular utility in connection with bottle capping machines and the like, and we have illustrated our invention as applied to the base of a crowning machine of the type shown in our copending application Serial No. 556,470, for container handling apparatus, but this is merely by way of illustration.

In the accompanying drawings illustrating the present preferred embodiment of our invention, Figure 1 is a plan of an apparatus embodying the invention.

Figure 2 is a side elevation partly broken away so as to show the supporting disc and rim therefor in section and the drive mechanism;

Figure 3 is a top plan view on a larger scale than Figure 2, showing part of the feed mechanism; and Figure 4 is a side elevation on a larger scale than Figure 2 of the apparatus shown in Figure 3;

In the drawings, which incidentally show part of a crowning machine embodying our invention, there is a base 1 supporting a casing 2 in which the drive means for the container handling mechanism is housed. On the base, there is a standard 3. Rotatably surrounding the standard 3 is a sleeve 16.

Bottles B are supplied by a conveyor consisting of a chain 18 and side guides 19. The bottles are guided into a channel or path 20 which takes them sidewise of the direction of travel of the conveying chain 18 and onto a ring or rim 21 surrounding a supporting disc 22. The rim 21 is driven at higher angular velocity than the disc 22.

The disc 22 is surrounded by a spider 23 having bottle receiving pockets 24 for positioning the bottles below the crowning head (not shown).

The bottles are advanced in the path 20 until the leading bottle is engaged by a check finger 25. This finger is periodically retracted so as to permit the leading bottle to advance in the path and move into one of the pockets 24. It will be noted that the leading bottle is checked just as it is about to pass from the rim 21 to the feed disk 22. When the finger 25 is retracted, the leading bottle is moved rapidly onto the disk 22 but without danger of tipping and is guided into the pocket by a spring pressed finger 26.

The finger 25 rocks on a fixed pin 27 and is normally urged to the position shown in Figure 3 by a spring 28. Retraction is effected by a rocking lever 29 connected to the finger 25 through a link 30. The lever 29 carries a cam follower 31 which is engaged by a cam 32 surmounting the spider 23. Rotation of the spider is therefore effective for retracting the finger 25 every time a bottle receiving pocket 24 passes the feed mechanism.

As shown in Figure 1, the machine is rotating in a counter-clockwise direction. The bottles B_c in the latter part of their travel on the disk 22 are engaged by a spring pressed finger 33 which prevents their tipping over after they have been crowned or otherwise treated. Continued rotation of the disk 22 brings the crowned bottles successively between the side guides forming a path or channel 20'.

The side guides of the channel 20' extend over the disk 22 and cause the crowned bottles to move from the disk onto the rim 21. Because of the fact that the rim is moved at higher angular velocity than the disk 22, it carries the bottle away rapidly. This is also an advantage in feeding since it moves the bottles rapidly into the pockets 24, thereby eliminating tipping and preventing choking of the machine.

It will be understood that the feed mechanism lies between the channels 20 and 20' and that such channels are symmetrically arranged. As hereinafter described, the feed mechanism, as well as the spider 23 and the cam 32, are made reversible so that the direction of rotation of the machine can be changed.

The machine is driven by a motor 34 contained in the casing 2 and controlled by a switch 34a. The motor is connected through a silent chain drive 35 to the driven shaft 36 of a variable speed transmission indicated generally by the reference character 37. This transmission is of the well known Reeves type and is provided with an adjusting wheel 38 lying outside the casing 2 whereby the transmission may be adjusted and the speed and direction of the machine thereby changed.

A driven shaft 39 of the transmission extends outside the casing 2 to receive a hand wheel 39a, whereby the machine may be turned by hand for purposes of adjustment, setting up and the like.

The driven shaft 39 of the transmission also carries a pinion 40 meshing with a gear 41 on a worm shaft 42. A worm 43 on the shaft 42 meshes with a worm wheel 44 connected to a gear 45 by bolts 46 (Figure 2). The gear 45 in turn is connected to the sleeve 16 and the disk 22 by bolts 47. Rotation of the worm wheel 44 is therefore effective for driving the sleeve 16 and the disk 22 which is formed integral therewith.

The gear 45 drives a pinion 48 carried by a stub-shaft 49. A pinion 50 is connected to the pinion 48 and rotates therewith. It meshes with a gear 51 connected to a spider 52 which carries the rim 21. The pinion 50 is larger than the pinion 48 and the gear 51 is smaller than the gear 45 and the rim 21 is therefore driven at a higher angular velocity than the supporting disk 22.

As shown in Figure 2, the cam 32 and the spider 23 are secured to the disk 22 by bolts 53 so as to be positively rotated therewith.

The conveyor chain 18 is driven from separate mechanism, not shown.

As above pointed out, the paths 20 and 20' whereby the bottles may be taken to and from the machine are substantially symmetrical and the feed mechanism is placed between these paths. The feed mechanism is shown in more detail in Figures 3 and 4 from which it will be seen that the finger 25 is carried by a base plate 79. This base plate is symmetrically arranged so that if it is desired to reverse the direction of the machine, the finger 25 may be moved from the solid line position of Figure 3 to the dotted line position thereof. The rocking lever 29 is mounted on a pin 80 located on the center line of the base 79 and the moving parts of the feed mechanism may therefore be turned upside down so that the finger 25 works in the channel 20' instead of in the channel 20. The position of the fingers 26 and 33 may be reversed.

As best shown in Figure 3, the spider 23 and the cam 32 are each made in two parts and may be used either side up. When the bolts 58 are removed, the spider and cam can be turned upside down and again secured by the bolts 58.

There are many cases where it is desired to have the machine run clockwise instead of counter-clockwise. With the arrangement above provided, the machine can be readily adapted in a few minutes to run in either direction, as desired.

We have illustrated and described the present preferred embodiment of the invention. It will be understood, however, that it is not limited to the form shown but may be otherwise embodied within the scope of the following claims.

We claim:

1. Apparatus for handling containers comprising a disk having a rim, the disk and the rim cooperating to form a container supporting surface, and means for rotating the disk and the rim at different angular velocities but in the same direction.

2. Apparatus for handling containers comprising a disk having a rim, the disk and the rim cooperating to form a container supporting surface, and means for rotating the rim at a higher angular velocity than the disk is rotated but in the same direction.

3. Apparatus for handling containers comprising a rotatable spider having a supporting disk, a rim outside the disk, feed means effective for supplying containers across the rim, and means for rotating the rim at a higher angular velocity than the spider and the disk but in the same direction.

4. Apparatus for handling containers comprising a rotatable spider having a supporting disk, a rim outside the disk, substantially stationary means for engaging a container on the disk and for guiding the same across the rim, and means for rotating the rim at higher angular velocity than the spider and disk but in the same direction.

5. Apparatus for handling containers comprising a rotatable spider having a supporting disk, a rim outside the disk, feed means effective for supplying containers across the rim, take-off means effective for guiding containers from the disk and across the rim, and means for rotating the rim at a higher angular velocity than the spider and the disk but in the same direction.

6. Apparatus for handling containers comprising a supporting disk, means for driving the disk, a rim surrounding the disk and rotatable relative thereto, gearing operatively connecting the disk and the rim and effective for causing angular rotation of the rim at higher angular velocity than the disk but in the same direction.

7. Apparatus for handling containers comprising a rotatable spider having a supporting disk, a rim outside the disk, container guides for guiding containers across the rim to the disk, and a stop arranged to check the movement of the container as it is about to pass from the rim onto the disk.

8. Apparatus for handling containers comprising a rotatable machine through which the containers are to be passed, a container support comprising inner and outer concentric annuli the inner annulus being driven at the same angular velocity and direction as the rotatable machine, the outer annulus being driven at a higher angular velocity and in the same direction as the rotatable machine, container guides having outlets symmetrically arranged with respect to the support, a sectional spider on the support having non-symmetrical container-receiving pockets, means for driving the machine and container supports in either direction as desired, and a single feed control mechanism adapted to be moved to and actuated in different positions where it will cooperate with containers supplied to either of said outlets.

In testimony whereof we have hereunto set our hand.

LOUIS DE MARKUS.
FRED A. FOUSER.